(12) United States Patent
LeCrone et al.

(10) Patent No.: US 6,260,110 B1
(45) Date of Patent: Jul. 10, 2001

(54) VIRTUAL TAPE SYSTEM WITH VARIABLE SIZE

(75) Inventors: Douglas E. LeCrone, Hopkinton, MA (US); Yeshayahu Hass, Hod Hasharon; Elcana Cohen, Tel Aviv, both of (IL)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 09/578,121

(22) Filed: May 24, 2000

Related U.S. Application Data

(63) Continuation-in-part of application No. 09/053,964, filed on Apr. 2, 1998, now Pat. No. 6,070,224.

(51) Int. Cl.[7] .............................. G06F 12/08; G06F 9/455
(52) U.S. Cl. .............................. 711/112; 703/24; 703/26; 703/27
(58) Field of Search ............... 711/111, 112; 703/24–27; 717/5

(56) References Cited

U.S. PATENT DOCUMENTS

| 4,775,969 | * 10/1988 | Osterlund | 369/53 |
| 4,787,031 | 11/1988 | Karger et al. | 364/200 |
| 5,239,647 | 8/1993 | Anglin et al. | 395/600 |
| 5,297,124 | * 3/1994 | Plotkin et al. | 369/32 |
| 5,438,674 | * 8/1995 | Keele et al. | 711/112 |
| 5,455,926 | * 10/1995 | Keele et al. | 711/112 |
| 5,475,834 | 12/1995 | Anglin et al. | 395/600 |
| 5,506,986 | 4/1996 | Healy | 395/600 |
| 5,544,347 | 8/1996 | Yanai et al. | 395/489 |

* cited by examiner

Primary Examiner—Matthew Kim
Assistant Examiner—Denise Tran
(74) Attorney, Agent, or Firm—Pearson & Pearson; George A. Herbster

(57) ABSTRACT

A method and apparatus for emulating a magnetic tape storage device with a conventional, unmodified magnetic disk storage device. I/O output requests for the emulated magnetic tape storage device are intercepted to determine whether they involve a virtual tape resource that comprises a magnetic disk storage device. Tape requests to such a resource are converted into one or more conventional magnetic disk storage requests to effect an analogous operation. The size of the virtual tape resource can be reduced below the normal data capacity for the emulated tape storage device.

12 Claims, 9 Drawing Sheets

FROM STEP 74
IN FIG. 3

SET THE TAPE VOLUME SIZE FOR THE APPLICATION IN THE CONFIGURATION FILE — 160

TO STEP 75
IN FIG. 3

FROM STEP 143
IN FIG. 7A

170 — DETERMINE AMOUNT OF DATA IN THE MAGNETIC DISK STORAGE DEVICE

171 — END OF VOLUME?

172 — GENERATE SENSE DATA INDICATING AN END OF VOLUME CONDITION

TO STEP 139
IN FIG. 7A

TO STEP 144
IN FIG. 7A

VIRTUAL TAPE SYSTEM WITH VARIABLE SIZE

CROSS REFERENCE TO RELATED APPLICATION

This is a continuation-in-part application of application for U.S. patent Ser. No. 09/053,964, filed Apr. 2, 1998, now U.S. Pat. No. 6,070,224, for a Virtual Tape System, which application is assigned to the same assignee as this invention.

BACKGROUND OF THE INVENTION

1. Field of the Invention

This invention generally relates to storage devices for use in data processing systems and more particularly to a system that enables a magnetic disk storage device to emulate a magnetic tape storage device.

2. Description of Related Art

Data centers that process and maintain large quantities of data generally include two types of mass storage devices, namely: magnetic disk storage devices and magnetic tape storage devices. Both types of mass storage devices typically operate in large-scale, multiple-processor systems. These systems further include sophisticated operating systems for controlling various resources connected to one or more central processors. The Multiple Virtual System of IBM (commonly called "MVS") is one such system.

Data centers operate with different configurations that may include certain magnetic disk storage devices organized as primary storage devices. Other magnetic disk storage devices may act as mirrors or may act as redundant storage devices to provide instantaneous backups. In a redundant configuration, data overwritten to the primary storage is immediately overwritten to the redundant magnetic disk storage device so no historical record is maintained of different versions of a system.

Typically magnetic disk storage devices are used for "active" data because access to specific data in a magnetic disk storage device is more rapid than access to data in a magnetic tape storage device. Magnetic tape storage devices typically store archived or back up data primarily because the perceived cost of magnetic tape storage is significantly lower than the perceived cost of magnetic disk storage.

Magnetic tape storage devices are devices of choice for generating historical backups. With the perceived costs of different media, tape storage has represented the only practical approach to providing such historical backups. Thus, in the case of a program development, for example, each revision of the program may be transferred to magnetic tape leaving only the most current version of the program on a magnetic disk storage device.

Transfers to magnetic tape storage generally occur in response to the execution of a batch file that identifies one or more files or volumes for backup to a particular magnetic tape storage device as a resource. A host processor runs the batch file to transfer the named file or files from the primary disk storage device to the secondary tape storage device. In a second approach the age of files on a primary storage device is ascertained. "Older" files are transferred to the tape. Unfortunately as a particular batch job must make a transfer to one tape, tape utilization often times is poor. That is, the data stored in a tape may occupy only a few percent of the available storage space in the tape. Moreover associated testing and transfer operations require host processing cycles that can degrade host performance for other applications.

In another approach a second magnetic disk storage device connects to the host. It generally will have about fifteen percent of the total capacity of the primary magnetic disk storage device. Aged data is swept from the primary magnetic disk storage device to the second magnetic disk storage device. This process is more efficient than the above-identified tape transfer process. As space on the second magnetic disk storage device is needed, the oldest data is transferred to the magnetic tape storage device. Although the process can improve performance somewhat, tape utilization still is generally poor. That is, it has been found that about one third of the applications will nearly fully utilize a tape, about one third will provide intermediate utilization and one third will under utilize the tape. For example, it is not unusual to find only a 5 megabyte file on a 1 to 2 gigabyte tape.

When such under utilization occurs, the real cost for tape becomes significantly higher. That is, the total cost of the media associated with the under utilized tape increases the "per-byte" cost of actual storage. If the number of tape drives in a system is not changed, increasing the number of tapes requires tape mounting and demounting that might otherwise be avoided if the tapes were utilized fully. The alternative is to add more tape drives, but that increases the floor space required for the data center.

Tape mount management or similar programs can operate with special hardware configurations that include disk buffers to accumulate data from jobs for subsequent transfer to tapes. Buffer capacity in such systems is limited. While this approach can also improve tape utilization, the system still relies on tapes and the need for tape farms or other physical tape drives.

In still another approach management software collects data to be transferred to magnetic tape. Then the management software transfers all the data from different jobs, commonly "data sets", onto a single magnetic tape. Initially this improves magnetic tape utilization. However, as known, data sets often are stored with a finite life, and a single tape will store data sets with lives ranging from a few days to a few months. As different data sets expire, tape utilization reduces. To maintain high levels of utilization, the tapes are recycled regularly to consolidate data sets on the magnetic tapes. This recycling process is extremely time consuming especially in data processing systems with hundreds or thousands of magnetic tapes.

Consequently the total costs for storing data on magnetic tape storage devices can be significantly higher than the perceived cost. Simultaneously with the increased need for tape storage, the cost of storage on magnetic disk storage devices is falling. Comparable transfer rates, even during data streaming, are achievable in both the magnetic disk storage devices and magnetic tape storage devices. Moreover the ability to dynamically relocate data on a disk device provides an opportunity to utilize space very effectively and achieve high levels of space utilization.

Several proposals have been made to use magnetic disk storage devices as magnetic tape storage devices, that is, to emulate a magnetic tape storage device or operate a magnetic disk storage device as a virtual tape device. However, such proposals require new special-purpose hardware and software modifications such that emulation is not transparent to the user. Consequently the emulation does not act as a true virtual device.

As known, a number of older data processing systems use magnetic tape storage devices as primary storage devices for data generated by an application program. In such applications, tape WRITE requests transfer data directly to a magnetic tape, rather than to a magnetic disk storage device as would occur with more recent applications. Many of these application programs continue to be used today.

Magnetic disk storage devices acting as virtual tapes can greatly enhance the performance of these applications because, as known, transfers to a magnetic disk storage system are often much faster than transfers to a magnetic tape storage system. However, as these applications undergo program continuing development, programming errors can appear. The introduction of endless loops that include a write tape request represent the introduction of one such error. If an endless loop contains a write tape request, writing operations to a conventional magnetic tape storage unit will continue until an end-of-tape return code is received. In some situations this could involve filling multiple tape cartridges with useless data.

Conventional virtual tape devices generally define a volume that corresponds to the total capacity of one or more tape devices. For example, if a particular application were working with a configuration that allocated five 800-MB tapes to an application, the existence of an endless loop would not result in an end-of-tape return code indicating a problem until 4 terabytes of disk memory had been consumed. While such data is easy to delete from a magnetic disk storage device, a primary problem lies in the resources that must be devoted to processing such an endless loop, particularly any common cache that is involved when an endless loop is processed. Such an allocation of resources will be to the detriment of other application programs that are running concurrently in a multi-processor system.

SUMMARY

Therefore it is an object of this invention to provide a magnetic disk storage device that operates as a virtual tape device.

Another object of this invention is to provide a virtual tape device that is transparent to a user.

Still another object of this invention is to provide a virtual tape device using magnetic disk storage that enables the definition of a tape volume size.

Yet another object of this invention is to facilitate the operation of a virtual tape device with arbitrarily sized tape volumes.

In accordance with this invention, a magnetic disk storage device operates as a virtual tape device responsive to tape requests from a user program including certain tape requests that can change the quantity of data on the virtual tape. The virtual tape has a selected size that defines a magnetic disk storage device volume size. Each certain tape request is converted into a corresponding disk request for the magnetic disk storage device. A determination is made as to whether the corresponding disk request will cause the amount of data in the magnetic disk storage device to exceed the defined volume size. A disk return code is generated based upon said determination, and an end-of-tape return code is generated in response to the generated disk return code when the disk request will cause the amount of data in the magnetic disk storage device to exceed the volume size.

In accordance with another aspect of this invention, a magnetic disk storage device operates as a virtual tape device that emulates a tape drive having a predetermined data storage capacity and that responds to tape requests from a user program including tape write requests. A configuration buffer defines a magnetic disk storage device volume size corresponding to a selected capacity of the virtual tape device that is less than the capacity of the tape device. Each tape write request is converted into a magnetic disk storage device write request that normally writes data to the magnetic disk storage device and generates first sense data. Second sense data is generated when a normal writing of data in the magnetic disk storage device will increase the total amount of data in the magnetic disk storage device beyond the defined volume size. First and second disk return codes are generated in response to the first and second sense data, respectively; and an end-of-tape return code is generated in response to the second disk return code.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
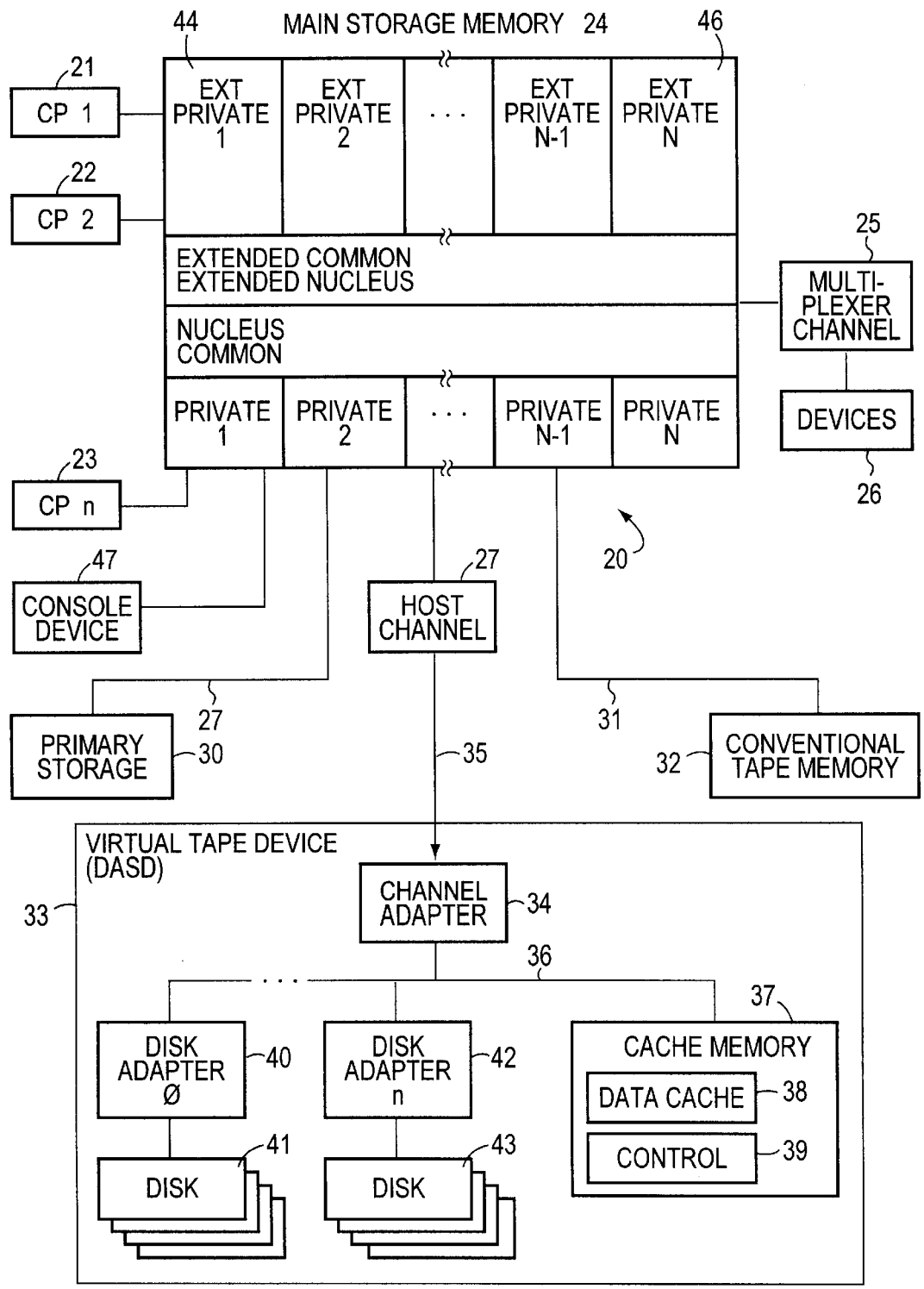
FIG. 1 depicts a data processing system incorporating a virtual tape device.

FIG. 1 depicts a data processing system 20 which, for purposes of explaining this invention, is shown as an IBM based system. The system 20 comprises multiple central processors (CP) identified as CP1-21, CP2-22 and CPn-23 where n is the maximum number of central processors that comprise the data processing system 20. Each central processor connects to a main storage unit 24. In an IBM MVS environment the main storage unit 24 is divided into a number of sections that, as known, include private, common, nucleus, extended nucleus, extended common and extended private storage areas.

A channel 25 provides a communications path for devices 26 such as printers, local terminals and the like. Another channel 27 establishes a communications path to a primary storage unit, such as a magnetic disk storage unit. Still another channel 31 establishes a communications path with a conventional tape storage system 32. Such systems and their operations, including the methods by which data is exchanged, are, as previously described, well known in the art.

A virtual tape device 33 adapted to operate in accordance with this invention is constituted by a conventional, unmodified magnetic disk storage device such as described in U.S. Pat. No. 5,206,939 of Moshe Yanai et al. for a System and Method for Disk Mapping and Data Retrieval, assigned to the same assignee as this invention and such as is available as a Symmetrix Series 5500 integrated cache disk array. The basic components of such a disk array include a channel or host adapter 34 that connects to a channel 35 from the host channel 27 and host 20. A bus 36 connects the channel adapter 34 to a cache memory 37. The cache memory 37 includes a data cache 38 and a control 39. A disk adapter 40 connects to the bus 36 and to a plurality of disks 41; another disk adapter 42, to a plurality of disks 43. A single physical integrated cache disk array acting as a disk virtual tape device 33 such as shown in FIG. 1 comprises a plurality of physical disk drives or disks that are organized into one or more logical volumes.

In the Symmetrix Series 5500 integrated cache disk array, input/output operations include reading and writing operations. Writing operations produce a transfer into the data cache 38. Control programs in the control 39 effect the transfer from the data cache 38 to a logical volume on one of the pluralities of disks 41 and 43. Reading operations are accomplished by first determining whether the requested data is available in the data cache 38. If it is not, the requested information transfers from a logical volume on one of the pluralities of disks 41 and 43 to the data cache 38 for subsequent transfer to the main storage unit 24.

As previously indicated, in accordance with conventional procedures in MVS systems, the main storage unit 24 can be considered as being divided into private, common, nucleus, extended nucleus, and extended private areas. For purposes of this explanation, it is assumed that the main storage memory 24 will contain a user program or application 44 in certain address space and an EMCSVT program 46 in other address space.

Figure 2:
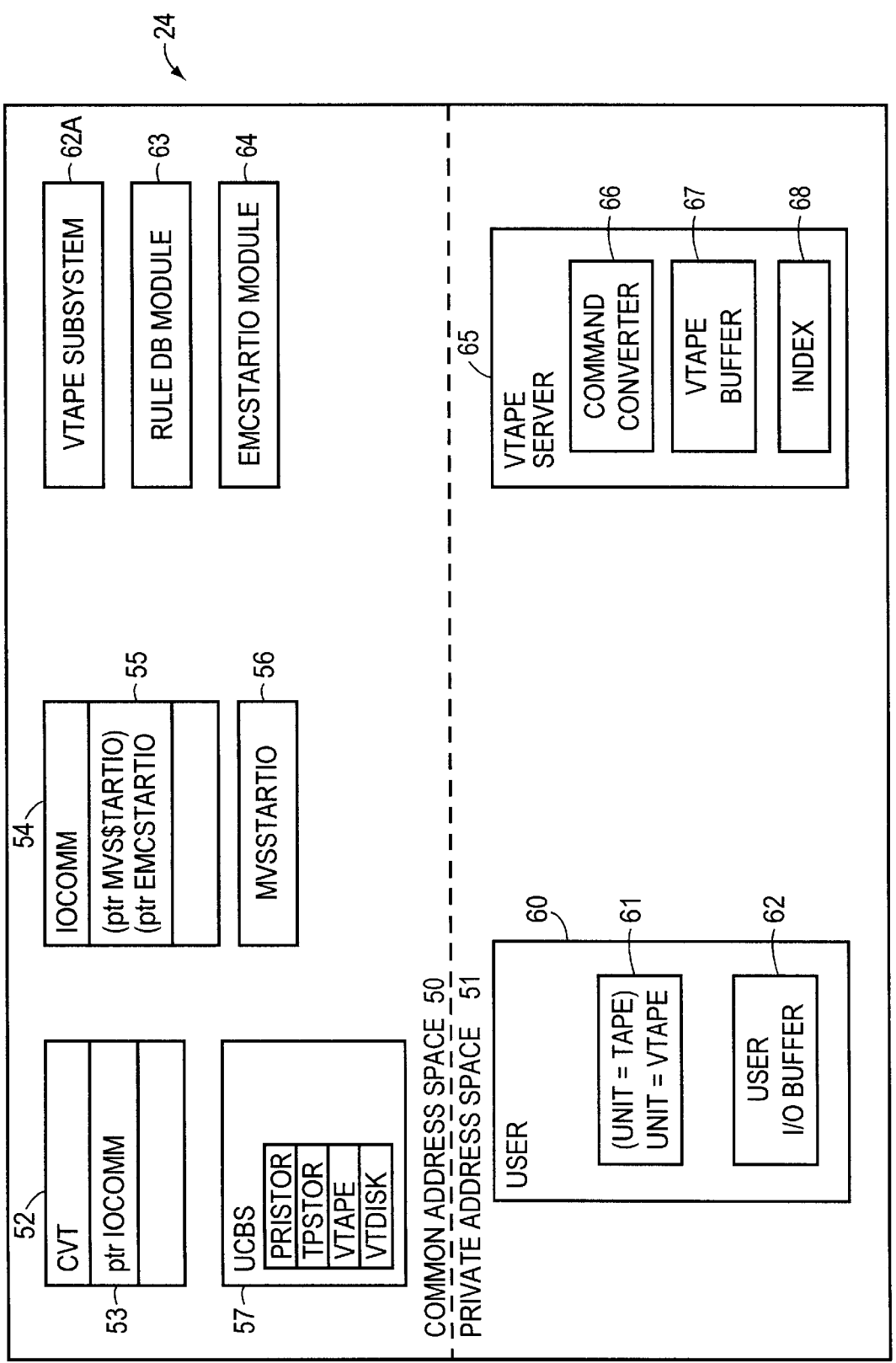
FIG. 2 depicts elements included in a main storage unit of the system of FIG. 1.

FIG. 2 depicts particular portions of the address space in the main storage unit 24 of FIG. 1 that are important to an understanding of this invention. Specifically FIG. 2 depicts a common address space or area 50 and a private address space or area 51. Within the common area 50 the MVS operating system includes a communications vector table (CvT) 52. A ptrIOCOMM pointer 53 defines a starting address for an IOCOMM table 54. The IOCOMM table 54 normally contains a ptrSTARTIO pointer 55 that identifies the location of an MVSSTARTIO module 56. The mnemonic MVSSTARTIO is used to distinguish the conventional STARTIO module provided in MVS from an EMCSTARTIO module described later. The common area additionally includes unit control blocks (UCBs) 57 that define various resources in the system such as a PRISTOR UCB and a TPSTOR UCB associated respectively with the primary storage unit 30 and conventional tape memory 32 shown in FIG. 1.

FIG. 2 also depicts a user program 60 that represents the combination of the address spaces 44 and 46 in FIG. 1. Of particular interest with respect to this invention are a unit identification block 61 and a user I/O buffer 62. In normal MVS operations if an I/O request identifies a resource, such as the primary storage device 30, the user program initiates a transfer by means of the ptrIOCOMM pointer 53. The MVS system identifies an appropriate unit control block 57, the PRISTOR UCB in the case of the virtual tape device 33, and transfers control to the MVSSTARTIO block 56 identified by the ptrSTARTIO pointer 55. The MVSSTARTIO module 56 initiates the transfer by processing appropriate Channel Control Words for effecting the transfer. When the operation is complete, the MVS system posts status information to the user application program 60 that indicates the success of the operation. If any error condition exists, sense data will also be transferred to identify the nature of the error. If the operation involves a data transfer, the user application program 60 identifies a user I/O buffer 62 as the storage location to which or from which data should be transferred. All the foregoing procedures are conventional MVS operating procedures that are well known in the art.

When a conventional magnetic disk storage device is to be added for operation as a virtual tape device 33 of FIG. 1, the EMCSVT program 46 in the main storage unit 24 of FIG. 1, defines a number of elements in the common storage area 50 and in the private storage area 51. Specifically the EMCSVT program defines a VTAPE subsystem block 62A, a RULE DB module 63 and a EMCSTARTIO module 64 in the common area 50. The private area 51 will contain a VTAPE server 65 which, in one embodiment, incorporates a COMMAND CONVERTER 66, a VTAPE buffer 67 and an INDEX block 68.

Figure 3:
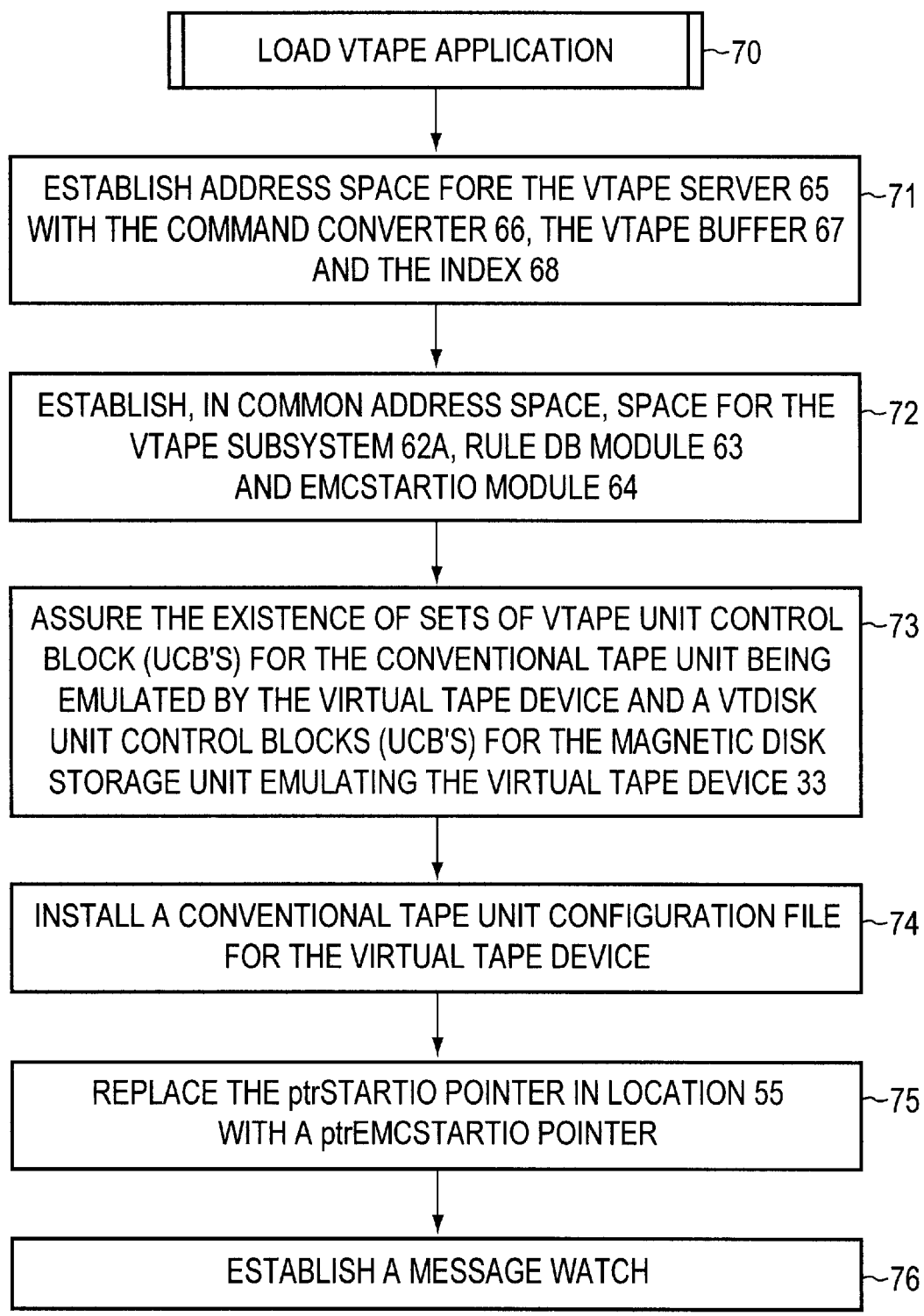
FIG. 3 is a flow diagram that depicts the steps for transferring an application program to the main storage unit in FIG. 1.

When it is desired to implement a virtual tape, the magnetic disk storage device is connected to the system as shown in FIG. 1. A LOAD VTAPE application procedure 70 as depicted in FIG. 3 loads the application. This procedure 70 uses step 71 to establish an address space for the VTAPE server 65, including the command converter 66, the VTAPE buffer 67 and the INDEX block 68. Step 72 establishes space for the VTAPE subsystem 62, the RULE DB module 63 and the EMCSTARTIO module 64 in the common address space.

The virtual tape unit is generally selected to emulate one of a known list of conventional tape units for which the structure of a unit control block (UCB) is known. Moreover, the initialization of a conventional tape unit generally involves generating a set of UCBs. In accordance with this invention step 73 assumes that two sets of one or two unit blocks exist for each virtual tape device. One set corresponds to the UCBs that would exist for the tape unit being emulated; the other set, for the actual magnetic disk storage device acting as the virtual tape device 33 that will emulate the tape unit. Duplicate sets of unit control blocks are not necessary. That is, if the data processing system already includes a magnetic tape storage unit of a same type as the selected type of tape unit being emulated, an additional set is not necessary. Similarly if a primary magnetic disk storage system and magnetic disk storage system that constitutes the virtual tape device 33 are of the same type, only one set of UCBs is necessary. Effectively step 73 assures the existence of one set of UCBs assigned to the virtual tape device and one set of UCBs assigned to the magnetic disk storage device that constitutes the virtual tape device.

If not previously included, a conventional tape unit configuration file for the virtual tape device is added to the system in step 74.

Step 75 replaces the ptrMVSSTARTIO pointer in location 55 with a ptrEMCSTARTIO pointer. This action diverts all subsequent input/output requests to the EMCSTARTIO module 64. As will be described in more detail later, the EMCSTARTIO module 64 will either process the request directly or transfer control to the MVSSTARTIO module 56.

Step 76 establishes a message watch. A message watch is a standard MVS operating procedure.

The specific procedures for implementing each of the foregoing steps will be readily apparent to persons of ordinary skill in the art. Moreover the order of the steps is arbitrary although steps 75 and 76 typically will be the last two steps in the procedure of FIG. 3.

Figure 4:
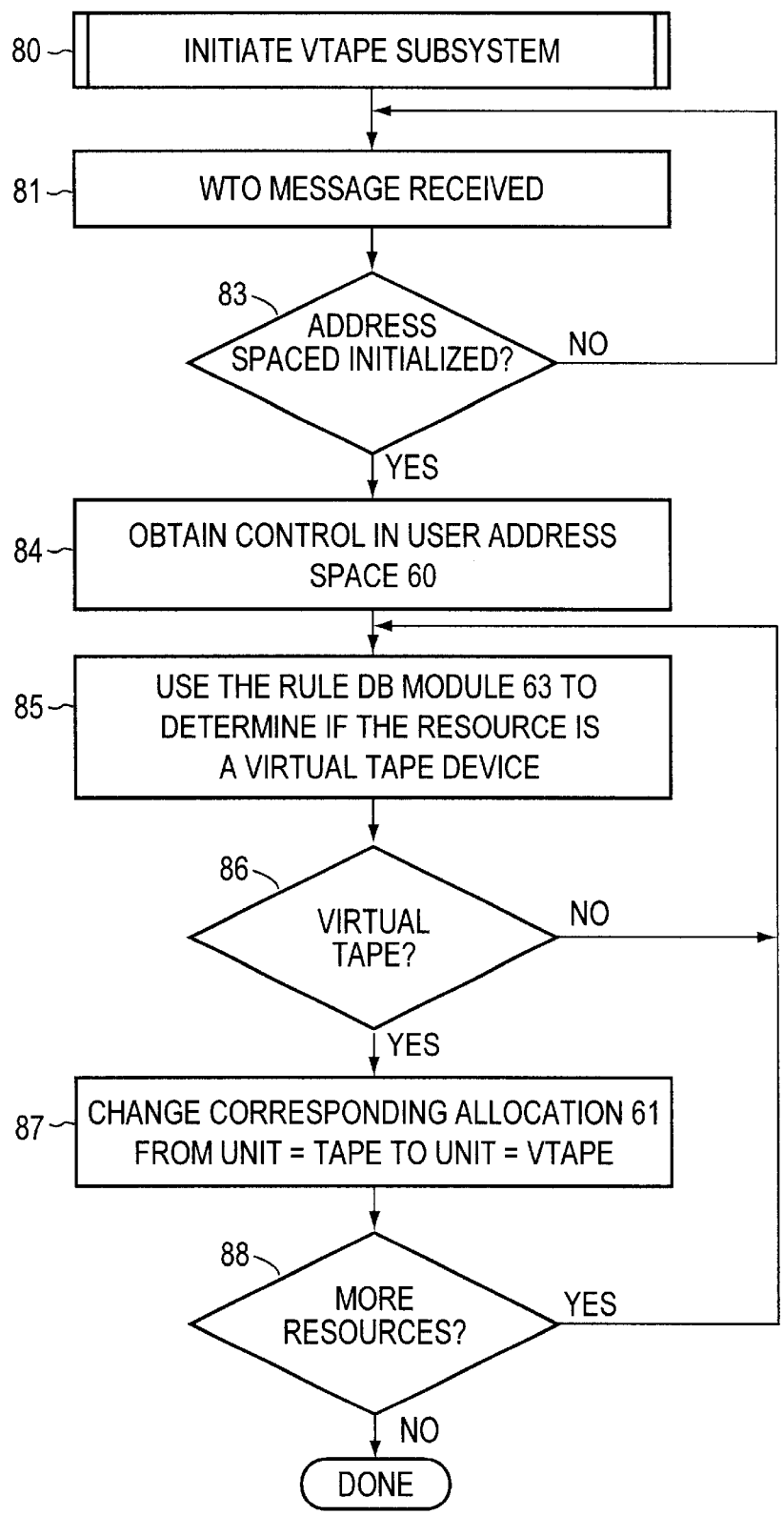
FIG. 4 is a flow chart of the process for initiating the subsystem loaded in FIG. 3.

Once the procedure in FIG. 3 completes, an INITIATE VTAPE SUBSYSTEM module 80 in FIG. 4 operates to perform the message watch function. That is, the system utilizes known procedures for enabling the VTAPE subsystem 62A in FIG. 2 to receive each WTO message transmitted by the MVS system. As known, WTO messages fall into a number of categories including those that indicate a job has been initialized. That is, the message indicates that address space, such as the address space 44 in FIG. 1 or address space 60 in FIG. 2, has been made available for a job. The receipt of such a WTO message causes step 83 to divert control to step 84. For all other WTO message types control returns to step 81 to await a next WTO message.

In step 84, the VTAPE subsystem 62A obtains control over the assigned user address space, such as the user address space 60 in FIG. 2. Step 85 is the first step of an iterative procedure for testing each resource device required by the job to determine if the device identifies a virtual tape device. During this procedure information in the RULE DB module 63 identifies each resource that operates as a virtual tape device 33. The use of rule data bases for analogous uses is also well known in the art.

Jobs in the data processing system typically use JCL statements that include DD statements to identify resources. Each resource can be identified by a data set name (DSN), by a unit number or by a volume-serial (VOLSER) number. To maintain user transparency, the RULE DB module 63 identifies each specific resource by all of its alternate names. Each identification then further indicates whether a DSN, unit number or VOLSER number is stored on a virtual tape device. For example, if a tape request identifies an address by a data set name (DSN), the procedure of step 85 compares the DSN with the list or concordance of each DSN assigned to the virtual tape. If the resource for the DSN has a matching entry, the resource is identified as a virtual tape.

If the RULE DB module 63 identifies a resource as a virtual tape device, step 86 shifts the procedure to step 87 to change the allocation in block 61 of FIG. 2 to indicate that the unit is now a virtual tape, as by changing UNIT=TAPE to UNIT=VTAPE or some other predetermined designation. When all the resources (i.e., all DD statements) have been tested, the system is initialized and prepared to process input-output requests so step 88 transfers control out of INITIATE VTAPE SUBSYSTEM 80 module. Otherwise control passes back to step 85 to identify another resource.

Figure 5:
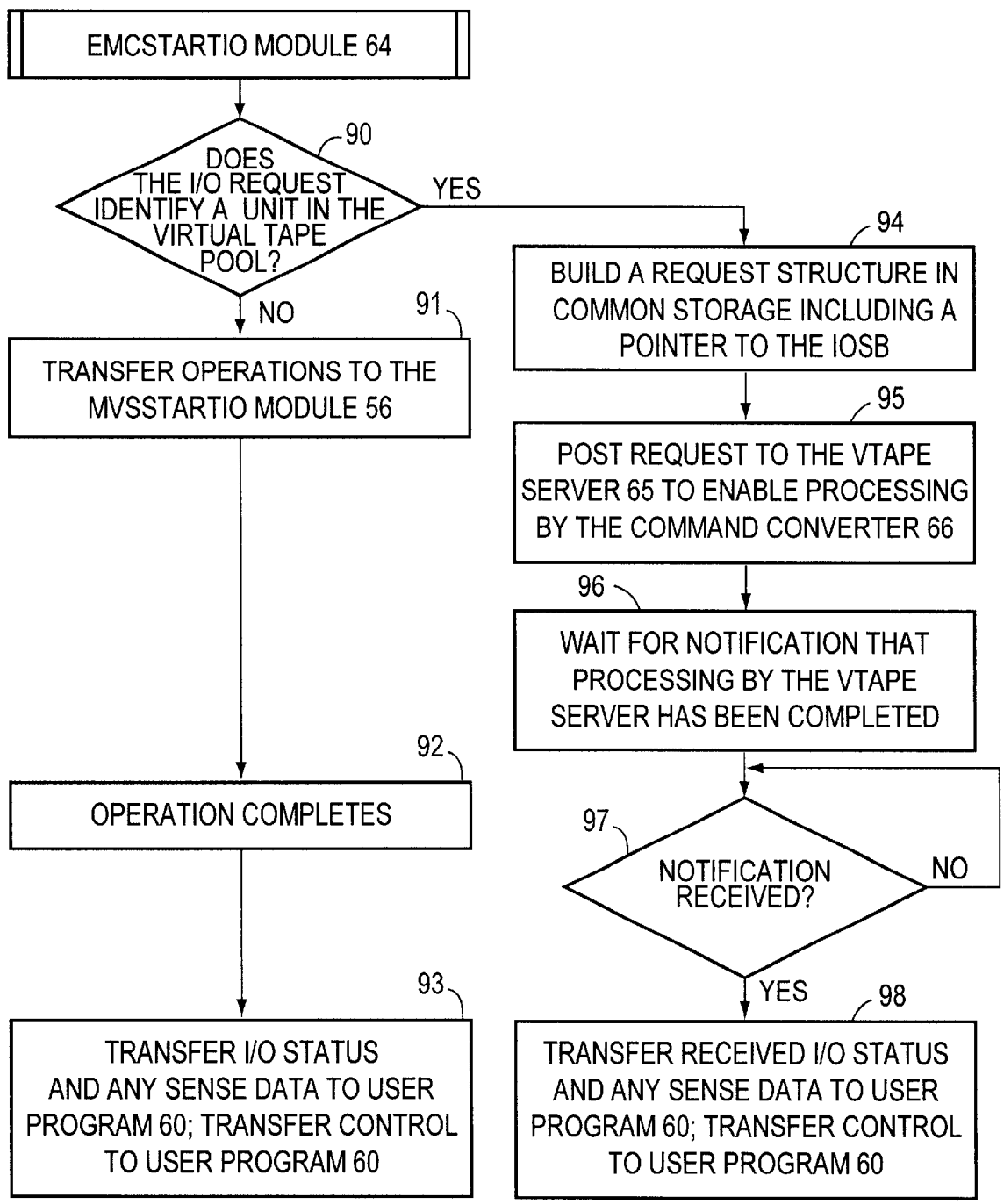
FIG. 5 is a flow diagram that depicts the response to an input-output request for transfer to one of the resources in the system of FIG. 1.

FIG. 5 depicts the EMCSTARTIO module 64 that is invoked in response to each I/O request from an application program, such as the user program in address space 60 in FIG. 2. These are input-output requests in the form of tape commands and constitute first requests from a first set of input-output requests. These first requests are identified as "tape requests" in the following discussion, and the following are representative examples.

1. a LOAD DISPLAY tape request for directing a particular tape to be mounted on a tape drive and to be allocated for use by subsequently generated tape requests;
2. a WRITE TAPE MARK tape request for recording a mark on the tape;
3. BACK and FORWARD SPACE BLOCK tape requests that move a tape backward and forward to a preceding or succeeding block, respectively;
4. BACK and FORWARD SPACE FILE tape requests that move a tape backward or forward to the beginning of a preceding or succeeding file;
5. a WRITE tape request for transferring a data block or blocks from a buffer in a user program to an identified tape;
6. a READ tape request for transferring a data block or blocks from an identified tape to a buffer in a user program; and
7. a REWIND UNLOAD tape request that causes the tape to be rewound and a message sent to an operator to remove the tape.

Normally conventional MVS procedures use the ptrIOCOMM pointer 53 of FIG. 2 in the communications vector table 52 to direct a transfer to the location 55 in the IOCOMM table 54. As previously indicated, however, the location 55 now contains the ptrEMCSTARTIO pointer to the EMCSTARTIO module 64, so any input/output request is processed initially by the EMCSTARTIO module 64.

Step 90 in FIG. 5 uses the information in the I/O request and the information in the RULE DB module 63 to determine whether the request identifies a unit in the virtual tape pool. If a virtual tape is not included, step 90 diverts to step 91 that transfers operations to the MVSSTARTIO module 56 to respond to the tape or other request according to conventional MVS procedures. When the conventional operation completes in step 92, an appropriate I/O status is generated in step 93 for transfer to the user program 60. If the I/O status indicates an error, sense data may also be returned. Control then passes back to the user program 60.

When a tape request identifies a unit in the virtual tape pool, step 90 diverts to step 94 that uses the command converter 66 in the VTAPE server 65 to convert each Channel Control Word in the tape request into one or more Channel Control Words that constitute a "disk request". Disk requests are input-output requests that are recognized by the magnetic disk storage device acting as the virtual tape device. These constitute second requests from a second set of input-output requests. In essence and as described later with respect to FIGS. 7A and 7B, the command converter 66 reformats Channel Control Words in a first tape request for the tape specified in a VTAPE UCB of UCB module 57 to one or more Channel Control Words that constitute a second or disk request for the magnetic disk storage device defined in the VTDISK UCB of UCB module 57.

Once the disk request has been constructed, step 95 posts the request to the VTAPE server 65. Posting a request to a particular application is a conventional MVS procedure for initiating an asynchronous process. Then the EMCSTARTIO module 64 enters a wait state, represented by steps 96 and 97. When the VTAPE server 65 completes the request, it issues a completion modification, as described in greater detail later along with the request status and any sense data. The sense data is in a context of a tape storage device. Steps 96 and 97 then divert operations to step 98 that transfers the status and any sense data to the user program 60 and transfers control back to the user program 60.

Figure 6:
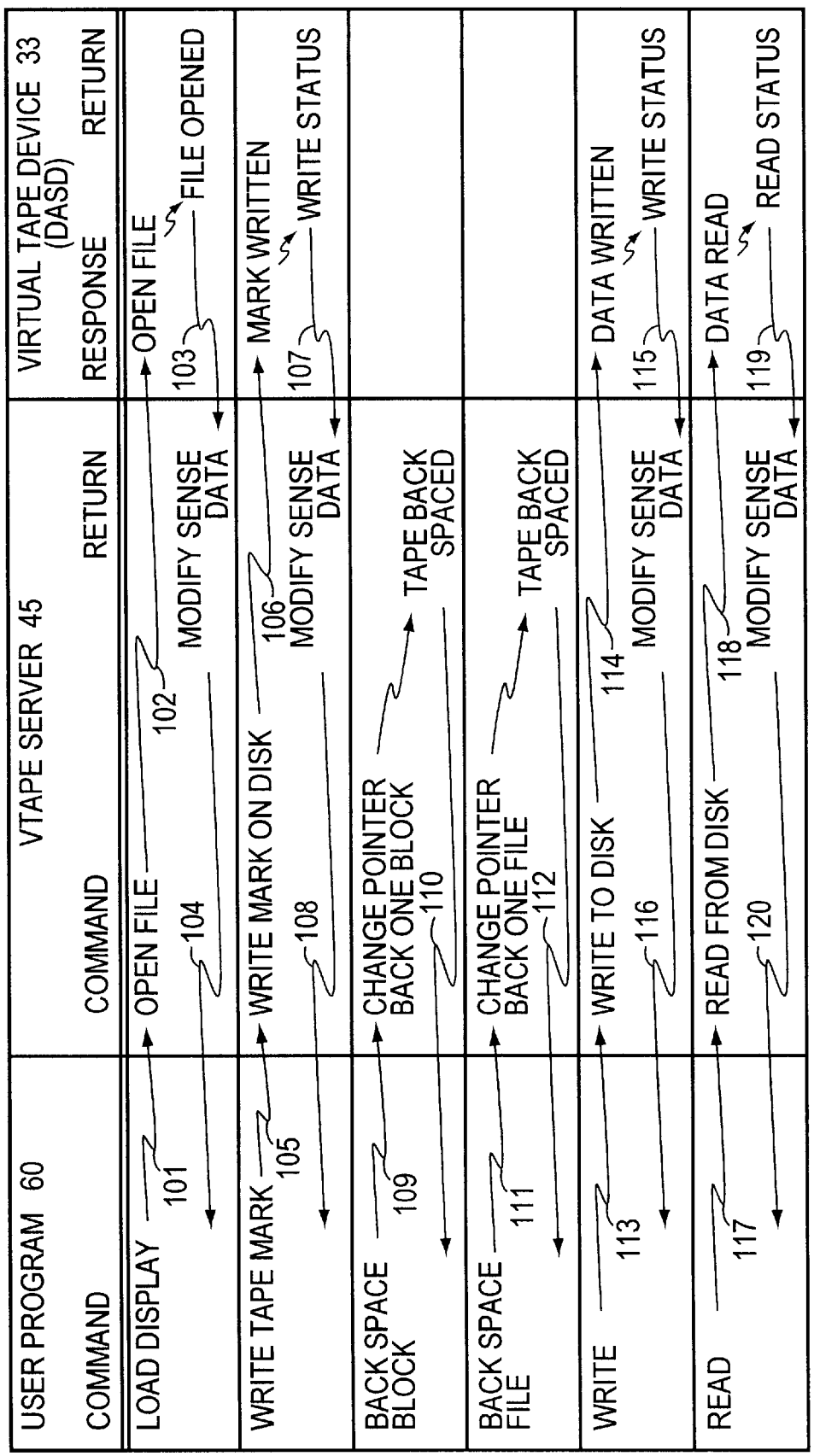
FIG. 6 is a table that defines a correlation between tape requests and disk requests.

FIG. 6 is a table that illustrates the overall operation of the system by means of specific examples. Generally, however, each example involves:

1. The transfer of a tape request from the user program 60 to the VTAPE server 65;
2. A response of the VTAPE server 65 that includes the generation of a disk request or other response;
3. The transfer of status from the virtual tape device 33; and
4. The transfer or generation of status for transfer to the user program 60.

With reference to the above listed specific examples, the object of a LOAD DISPLAY tape request is to send a message to an operator at the tape farm to retrieve and place the tape on a drive. When that operation has been completed, a predetermined status may be generated to indicate a successful completion of the request. When the tape unit is a VTAPE unit, the command converter 66 in FIG. 2 receives the LOAD DISPLAY tape request at 101 and responds to this tape request by generating an OPEN FILE disk request that uses the data in the INDEX block 68 of FIG. 2 to provide a file address. The magnetic disk storage device acting as the virtual tape device 33 responds to the OPEN FILE disk request at 102 and generates status that indicates whether the file was opened successfully. The VTAPE server 65 then transfers the status from the virtual tape device 33 in step 103 and to the user program 60 in step 104. If the request was not processed successfully, the VTAPE server 65 receives sense data in the context of a disk request at step 103 and performs any necessary modifications to produce sense data having meaning in the context of a tape request for transfer at step 104. Typically the request status passes through the VTAPE server 65 without change.

If a user program 60 generates a WRITE TAPE MARK tape request, step 105 conveys the tape request to the VTAPE server 65 that generates a WRITE disk request. This operation loads predetermined data corresponding to the tape mark at an addressed location on the storage disk (step 106). When the operation is completed, steps 107 and 108 transfer the request status from the magnetic disk storage device to the user program 60 with the VTAPE server modifying any sense data as previously indicated.

The INDEX block 68 in FIG. 2 contains, among other information, pointers to files stored on the magnetic disk storage device. For example, a set of pointers identify the starting addresses for different files and for the preceding and succeeding files. Similar pointers identify the locations of each block.

In step 109 a BACK SPACE BLOCK tape request transfers from the user program 60 to the VTAPE server 65. The VTAPE server 65 sets the pointer with the address of the preceding block using a conventional write operation. Then the VTAPE server 65 generates a request status for return to the user program 60 in step 110. There is no communication with the virtual tape device 33.

Similar activity occurs when the user program 60 generates a BACK SPACE FILE tape request. After receiving the tape request at step 111, the VTAPE server 65 replaces a pointer with the address of the preceding file. At step 112 the VTAPE server 65 generates a request status indicating that the operation is complete and transfers that status and any appropriate sense data to the user program 60. Again, there is no interaction between the VTAPE server 65 and the virtual tape device 33.

When there is no interaction as shown in the foregoing examples, no physical tape movement occurs in the virtual tape unit. Consequently the operation generally completes essentially instantaneously without the time delays involved in conventional tape units where actual tape movement must occur. When a user program 60 transfers a WRITE tape request to the VTAPE server 60 in step 113, the VTAPE server 65 generates one or more corresponding Channel Control Words for transfer to the magnetic disk storage device in step 114. The status acknowledging the completion of the transfer and any sense data are received at step 115. At step 116 the VTAPE server 65 conveys the request status and converts any sense data into a form that has meaning in the context of the tape request.

A similar process occurs in response to a READ tape request. The VTAPE server 65 receives the tape request at step 117, generates a READ disk request for transfer at step 118. Then it receives the status and any sense data at step 119 and transfers the status with sense data it modifies to the user program 60 at step 120.

The VTAPE server 65 performs similar operations in response to other tape requests. The following discussion defines the actual operations of the VTAPE server 65 including the command converter 66 in greater detail.

As previously indicated, the VTAPE server 65 operates as an asynchronous process. Steps 130 and 131 in FIG. 7A function to initiate the process whenever the EMCSTARTIO module 64 in FIG. 5 posts a request in step 95. Each posted request is a tape request in the form of one or more Channel Control Words. Step 132 decodes each Channel Control Word in the tape request and generates corresponding Channel Control Words for a disk request.

If a Channel Control Word in a tape request requires a transfer from storage (i.e., a reading operation), steps 133 and 134 divert control to step 135 wherein the command converter 66 in the VTAPE server 65 produces the corresponding disk request with one or more Channel Control Words thereby to construct a disk read request to the VTAPE buffer 67. In step 136 the VTAPE server 65 transfers data from addressed portions of the disk to the VTAPE buffer 67. At this point the VTAPE server 65 will also receive the status and any sense data resulting from the operation of the read request. Step 137 uses an MVS facility to transfer the data block from the VTAPE buffer 67 to the user I/O buffer 62. At this point the reading operation completes in step 138.

Step 139 processes the status and any sense data. If sense data is received, the VTAPE server processes that sense data into a form that has meaning in the context of a tape request in step 140 before transferring to step 141 in FIG. 7B to determine if more Channel Control Words need to be processed in the request. Control passes back to step 132 if Channel Control Words need to be processed. When no further Channel Control Words are pending the VTAPE server 65 generates the notification that signals the EMCSTARTIO module to 64 in FIG. 65 at steps 96 and 97.

A WRITE tape request produces analogous steps, but in a slightly different sequence. If a Channel Control Word defines a write request, step 134 transfers control to step 143 thereby moving data from the user I/O buffer 62 to the VTAPE buffer 67. Then step 144 enables the VTAPE server 65 to construct a disk request for the Channel Control Word for a write with a pointer to the VTAPE buffer 67 as the source of the data. Step 145 effects the transfer of data in the VTAPE buffer 67 to the disks. When the operation has been completed at step 145, control passes to step 139 for operations as previously described.

As previously indicated, some tape requests do not involve a data transfer to or from the magnetic disk storage device. When the EMCSTARTIO module 64 processes one of these requests, step 133 in FIG. 7A transfers control to step 148 in FIG. 7B that constructs the corresponding magnetic disk storage device request. Step 149 then initiates the corresponding request. For example, a tape request could request the tape to be positioned at a particular record. As previously stated, the INDEX block 68 in FIG. 2 cross references the locations of each tape record in the disk drive. In a conventional magnetic tape storage device the response time for such a request may take a significant time, measured in seconds, to move to that record. In accordance with this invention, however, it is merely necessary to change a pointer.

Once the request is processed, it is necessary for the VTAPE server 65 to generate or transfer request status and sense data depending upon whether interaction occurred with the virtual tape device. For example, the LOAD DIS- PLAY and WRITE TAPE MARK requests shown in FIG. 6 produce an interaction with the virtual tape device 33, so that device produces a request status and sense data if necessary. In that case step 150 diverts to step 151 to transfer the status and any sense data from the virtual tape device. For requests not involving interaction, such as the BACK SPACE BLOCK and BACK SPACE FILE tape requests; control passes from step 150 to step 152 whereupon the VTAPE server 65 generates the request status and any necessary sense data for return to the user program 60. Control then passes to step 141 to either complete the process procedure in step 142 or to return control to step 132.

With this as background, an implementation of this invention includes two basic steps. The first step occurs during the initialization of the VTAPE system as shown in FIG. 3 by defining an arbitrary tape volume size. The second step establishes a detector for sensing when the corresponding magnetic disk storage device volume, that is sized to correspond to the arbitrary selected volume, is filled.

Figure 8:
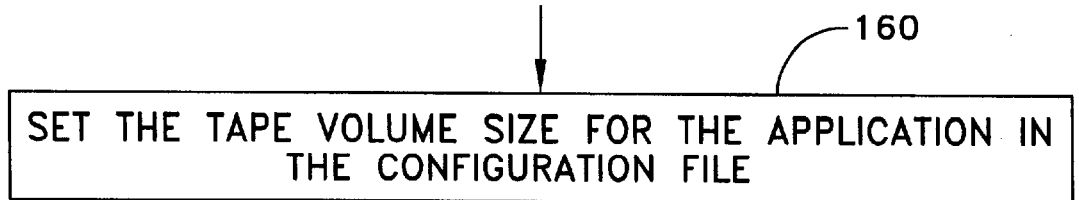
FIG. 8 depicts a modification to the flow diagram of FIG. 3 that enables this invention to be practiced.

FIG. 8 depicts a modification through the addition of step 160 between steps 74 and 75 in FIG. 3. Specifically, step 160 sets the virtual tape volume size for the application in the configuration file for the conventional tape unit. The size generally will be less than the maximum tape size and will be a somewhat arbitrary number. For example, assume a tape device being emulated has a 800 MB capacity while it is expected that an application program being developed would require at most a 50 MB file. Step 160 allows the configuration of the virtual tape to be set with a maximum file size of 50 MB. Thus, step 160 allows the definition of a disk storage device volume size that is less than the given capacity for the tape device being emulated, such as an 800-MB tape capacity of the example.

Figure 7A:
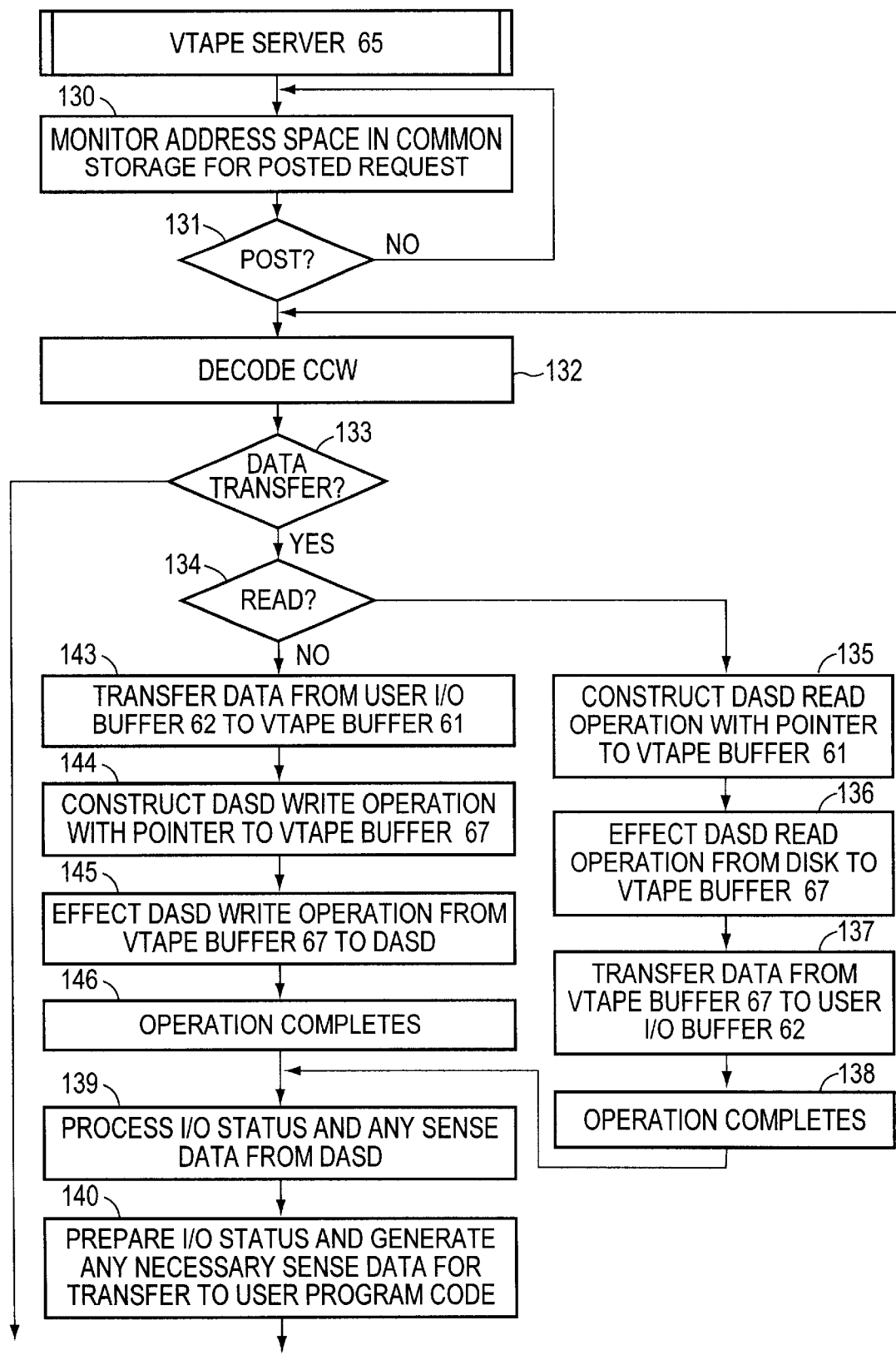
FIGS. 7A and 7B constitute a flow chart depicting the operation on another module shown in FIG. 2.
Figure 7B:
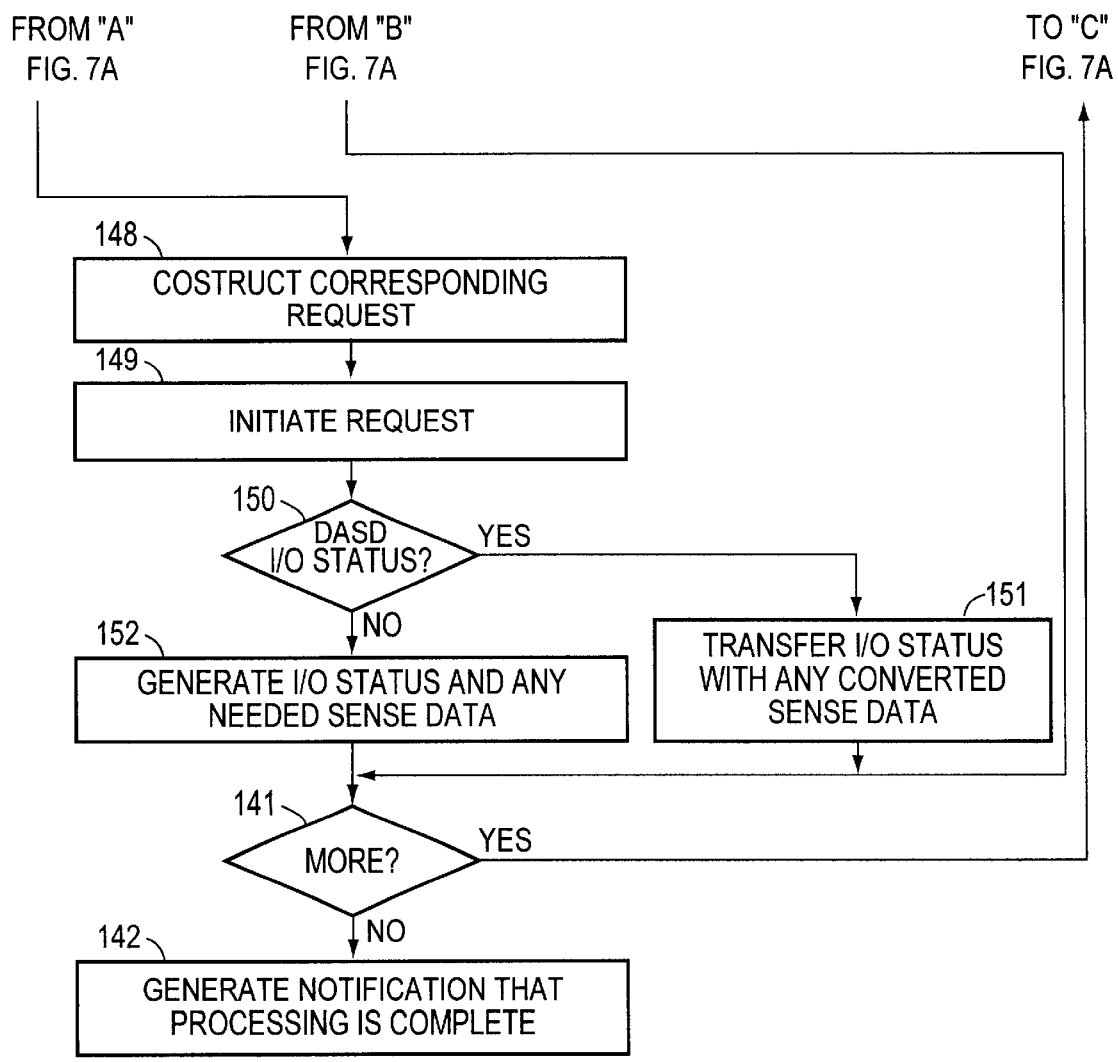
Figure 9:
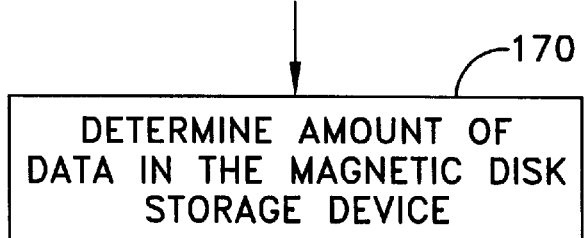
FIG. 9 depicts a modification to the flow chart of FIG. 7A that enables the practice of this invention.
Figure 9:
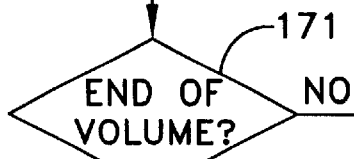
Figure 9:
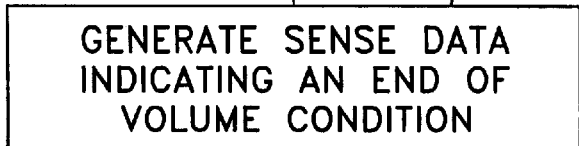

FIG. 9 depicts the modification to the flow chart of FIG. 7A that enables the detection of a full tape volume and the generation of an end-of-tape return code when the smaller volume is filled. As previously described, when a WRITE tape request is received, the write tape request converts to a corresponding disk WRITE request for the magnetic disk storage device. A WRITE tape request is an example of a tape request that can change the quantity of data on the virtual tape generally by increasing the quantity of data.

As previously described with respect to FIG. 7A, control passes to step 143 that transfers data from the user I/O buffer 62 to the VTAPE buffer 67. Then as shown in FIG. 9, control transfers to step 170 that determines the amount of data previously stored in the magnetic disk storage device. If the amount does not equal the selected amount, control passes from step 171 back to step 144 that constructs the DASD write operation and effects the write operation to the magnetic disk storage device in step 145 and completes the operation in step 146. The magnetic disk storage device generates sensed data according to step 139 and converts that sensed data into a corresponding return code from the magnetic disk storage device and a corresponding return code to the application program.

If, however, the total amount of data on the volume after the tape WRITE request will exceed the allocated selected volume size, step 171 transfers to step 172. Step 172 generates sense data indicating an end of disk volume condition. Step 132 then transfers to step 139 bypassing steps 144 through 146 thereby disabling any subsequent attempt to transfer data into the filled emulated tape volume. Step 139 processes this second sense data to produce an appropriate return code in the context of the magnetic disk storage device. Step 140 converts the corresponding return code into an end-of-tape return code for transfer to the application program.

If a program under development includes an endless loop with a tape write request, data will be written to the virtual tape drive until that arbitrarily set limit is met. Then an end-of-tape return code will be sent to the application program. Consequently, with this invention the virtual tape system detects the existence of the endless loop or like condition significantly earlier than if the virtual tape size were selected to be equal to the full size of the tape device being emulated. As any operation that writes data to the magnetic disk storage device consumes significant resources, the ability to limit the number of write transfers being made erroneously can greatly improve that overall operation of the magnetic disk storage device, particularly with respect to other concurrently running application programs.

Thus in accordance with this invention there is provided a method and apparatus that enables a conventional magnetic disk storage device to emulate a magnetic tape storage device without modification to any of the hardware, firmware or software assembled with the magnetic disk storage device. Moreover, this invention enables the selection of a data capacity for the virtual tape that is less than the data capacity for the tape being emulated. This invention has been described in terms of a particular embodiment. Many modifications can be made. For example, in the disclosed embodiment, data transfers between the USER I/O BUFFER 62 and the VTAPE buffer 67. Other MVS facilities allow alternate approaches to be taken. For example in some applications it may be advantageous to transfer data directly between the virtual tape device 33 and the USER I/O BUFFER 62 in lieu of the involvement for the VTAPE buffer 67. The description defines procedures for handling a single tape request to a virtual tape device. It will be apparent that multiple tape requests may be handled simultaneously by using multiple VTAPE command converters, dispatchers or the like.

Thus, although this invention has been disclosed in terms of certain embodiments, it will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. In a magnetic disk storage device operating as a virtual tape device responsive to tape requests from a user program including certain tape requests that change the quantity of data on the virtual tape, a method for generating an end-of-tape return code for the user program comprising the steps of:
   A) defining a magnetic disk storage device volume size corresponding to a selected size of the virtual tape device,
   B) thereafter responding to the certain tape requests by:
      i) converting the certain tape request to a corresponding disk request for the magnetic disk storage device,
      ii) determining whether the corresponding disk request will cause the amount of data in the magnetic disk storage device to exceed the defined volume size,
      iii) generating a disk return code based upon said determination, and
   C) generating an end-of-tape return code in response to the generated disk return code when the disk request will cause the amount of data in the magnetic disk storage device to exceed the volume size.

2. A method as recited in claim 1 wherein the certain tape requests are constituted by tape write requests that said converting step translates into corresponding disk write requests.

3. A method as recited in claim 2 additionally including the step of disabling the transfer of any data to the magnetic disk storage device in response to a tape write request when a disk return code corresponding to the end-of-tape return code is generated.

4. A method as recited in claim 3 additionally comprising a step of writing data to the magnetic disk storage device, said determination of disk volume size being made prior to said writing step.

5. A method as recited in claim 1 wherein a tape device being emulated by the virtual tape has a given data capacity and wherein the defined disk storage device volume size corresponds to a selected size that is less than the given capacity for the tape device being emulated.

6. A magnetic disk storage device operating as a virtual tape device responsive to tape requests from a user program including certain tape requests that can change the quantity of data on the virtual tape, said magnetic disk storage device comprising:

A) a configuration buffer including a definition of a magnetic disk storage device volume size corresponding to a selected capacity of the virtual tape device, B) a control responsive to the certain tape requests including:
  i) a command converter for generating magnetic disk storage device commands in response to certain tape requests,
  ii) a control that determines whether the corresponding disk request will cause the amount of data in the magnetic disk storage device to exceed the defined volume size, and
  iii) a disk return code generator for producing a disk return code based upon said determination, and C) a user program return code generator that produces an end-of-tape return code in response to the generated disk return code when the disk request will cause the amount of data in the magnetic disk storage device to exceed the volume size.

7. A magnetic disk storage device as recited in claim 6 wherein the certain tape requests are constituted by tape write requests that said command converter translates into disk write requests.

8. A magnetic disk storage device as recited in claim 7 additionally including means for disabling the transfer of any data to the magnetic disk storage device when the end-of-tape return code is generated.

9. A magnetic disk storage device as recited in claim 8 wherein said control makes a determination for a disk write request prior to the transfer of data to the magnetic disk storage device.

10. A magnetic disk storage device as recited in claim 6 wherein a tape device being emulated by the virtual tape has a given data capacity and wherein said configuration buffer includes means for storing a selected volume size that corresponds to a tape volume that is less than the given capacity for the tape device being emulated.

11. In a magnetic disk storage device operating as a virtual tape device that emulates a tape drive having a predetermined data storage capacity and that responds to tape requests from a user program including tape write requests, a method comprising the steps of:

A) converting a tape write request into a magnetic disk storage device write request, B) establishing a configuration buffer that defines a magnetic disk storage device volume size corresponding to a selected capacity of the virtual tape device that is less than the capacity of the tape device, C) normally writing data to the magnetic disk storage device and generating first sense data in response to the writing operation, D) generating second sense data when a normal writing of data in the magnetic disk storage device will increase the total amount of data in the magnetic disk storage device beyond the defined volume size, E) generating first and second disk return codes in response to the first and second sense data, respectively, and F) generating an end-of-tape return code in response to the second disk return code.

12. A magnetic disk storage device operating as a virtual tape device that emulates a tape drive having a predetermined data storage capacity and that responds to tape requests from a user program including tape write requests, said magnetic disk storage device comprising:

A) a command converter that translates a tape write request into a magnetic disk storage device write request, B) a configuration buffer that defines a magnetic disk storage device volume size corresponding to a selected capacity of the virtual tape device, C) a magnetic disk storage device write control that writes data into the magnetic disk storage unit and generates first sense data in response to the writing operation, D) an end-of-tape control that enables said write control when the data in the magnetic disk storage device will be within the selected capacity after a write operation, said end-of-tape control generating second sense data when the write operation will increase the total amount of data in the magnetic disk storage device beyond the defined volume size, E) a disk return code generator that responds to the first and second sense data by producing first and second disk return codes, respectively, and F) a user program return code generator that produces an end-of-tape return code in response to the second disk return code.

* * * * *